United States Patent
Larrick et al.

(10) Patent No.: US 9,128,191 B2
(45) Date of Patent: Sep. 8, 2015

(54) HE-3 DETECTOR GUARD BAND

(71) Applicant: General Electric Company, Schenectady, NY (US)

(72) Inventors: Raymond Larrick, Streetsboro, OH (US); Mark Edwin Burns, Burton, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 275 days.

(21) Appl. No.: 13/716,330

(22) Filed: Dec. 17, 2012

(65) Prior Publication Data
US 2014/0166891 A1   Jun. 19, 2014

(51) Int. Cl.
*G01T 3/00* (2006.01)
*G01T 3/08* (2006.01)

(52) U.S. Cl.
CPC .. *G01T 3/008* (2013.01); *G01T 3/00* (2013.01)

(58) Field of Classification Search
CPC ................................. G01T 3/00; G01T 3/008
See application file for complete search history.

(56) References Cited

U.S. PATENT DOCUMENTS

| | | | |
|---|---|---|---|
| 2,506,944 A | 5/1950 | Stauffer et al. | |
| 2012/0217406 A1* | 8/2012 | McGregor et al. | 250/361 R |
| 2013/0119261 A1* | 5/2013 | McKinny et al. | 250/391 |
| 2014/0061490 A1* | 3/2014 | Zhao et al. | 250/390.01 |

FOREIGN PATENT DOCUMENTS

GB    1032002 A    6/1966

OTHER PUBLICATIONS

International Search Report and Written Opinion issued in connection with WO Patent Application No. PCT/US2013/070701 dated Jul. 29, 2014.

* cited by examiner

*Primary Examiner* — Yara B Green
(74) *Attorney, Agent, or Firm* — Cooper Legal Group, LLC

(57) ABSTRACT

A neutron detector for detecting neutrons includes an exterior shell bounding and sealing an interior volume. The exterior shell serves as a cathode. A central structure extends longitudinally within the exterior shell. The central structure serves as an anode and is maintained at a first voltage. The neutron detector includes an insulating portion extending between the central structure and the exterior shell and longitudinally past a shell end of the exterior shell towards a structure end of the central structure. A guard structure extends circumferentially around an outer insulating surface. The guard structure is positioned on the insulating portion between the shell end and the structure end. The guard structure is maintained at a second voltage such that a leakage current on the outer insulating surface is absorbed by the guard structure. A method of detecting neutrons with the neutron detector is also provided.

20 Claims, 4 Drawing Sheets

HE-3 DETECTOR GUARD BAND

BACKGROUND OF THE INVENTION

1. Field of the Invention

The present invention relates generally to neutron detection using a Helium-3 ($^3$HE) neutron detector, and specifically relates to a $^3$HE neutron detector including a guard structure.

2. Discussion of the Prior Art

Helium-3 ($^3$HE) neutron detectors are used to detect free neutrons. In general, $^3$HE neutron detectors include an anode extending through a cathode shell, with an insulator separating the anode from the cathode shell. To detect neutrons, a quantity of $^3$He gas is provided within an interior of the cathode shell. Ions/particles resulting from neutron reactions within the cathode shell will collide with the $^3$He gas to produce free electrons. These free electrons are drawn to the anode, whereupon the free electrons generate a signal/electronic pulse. This signal/electronic pulse is analyzed to determine a neutron count rate. Turning now to FIG. 4, an example of a previously known neutron detector 300 is shown. The neutron detector 300 includes an exterior shell 320, a central structure 340, and an insulating portion 360. However, in operation, leakage current forms on the surface of the insulator as a result of degradation or breakdown of the insulator. Within the example of FIG. 4, leakage current can travel along the insulating portion 360 in a first direction 380 (shown generically/schematically as an arrow in FIG. 4). The leakage current traveling along the first direction 380 can reach a structure end 342 of the central structure 340. This leakage current can adversely affect a measuring capability of the neutron detector 300 by generating a false current. Specifically, this leakage current can produce false detection of neutrons and can affect the neutron count rate. Accordingly, there is a need and it would be beneficial to attend to the issue concerning leakage current flowing to the anode.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a neutron detector for detecting neutrons. The neutron detector includes an exterior shell bounding and sealing an interior volume. The exterior shell serves as a cathode. The neutron detector includes a central structure extending longitudinally within the exterior shell. The central structure serves as an anode and is maintained at a first voltage. The neutron detector includes an insulating portion extending radially between the central structure and the exterior shell. The insulating portion extends longitudinally past a shell end of the exterior shell towards a structure end of the central structure. The neutron detector includes a guard structure extending circumferentially around an outer insulating surface of the insulating portion. The guard structure is positioned on the insulating portion between the shell end and the structure end. The guard structure is maintained at a second voltage such that a leakage current on the outer insulating surface of the insulating portion is absorbed by the guard structure.

In accordance with another aspect, the present invention provides a neutron detector for detecting neutrons. The neutron detector includes an exterior shell bounding and sealing an interior volume. The exterior shell serves as a cathode. The neutron detector includes a central structure extending longitudinally within the exterior shell. The central structure serves as an anode and is maintained at a first voltage. The neutron detector includes an insulating portion extending radially between the central structure and the exterior shell. The insulating portion extends longitudinally past a shell end of the exterior shell towards a structure end of the central structure. The neutron detector includes a guard structure extending circumferentially around an outer insulating surface of the insulating portion. The guard structure is positioned on the insulating portion between the shell end and the structure end. The guard structure is maintained at a substantially equivalent voltage as the central structure. The guard structure is electrically isolated from the central structure such that a leakage current on the outer insulating surface of the insulating portion is absorbed by the guard structure.

In accordance with another aspect, the present invention provides a method of detecting neutrons with a neutron detector. The method includes the step of providing a central structure that extends longitudinally within an exterior shell. The method further includes the step of maintaining the central structure at a first voltage. The method further includes the step of providing an insulating portion radially between the central structure and the exterior shell with the insulating portion extending longitudinally past a shell end of the exterior shell. The method further includes the step of providing a guard structure extending circumferentially around the insulating portion. The method also includes the step of maintaining the guard structure at a second voltage such that a leakage current on the insulating portion is absorbed by the guard structure.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
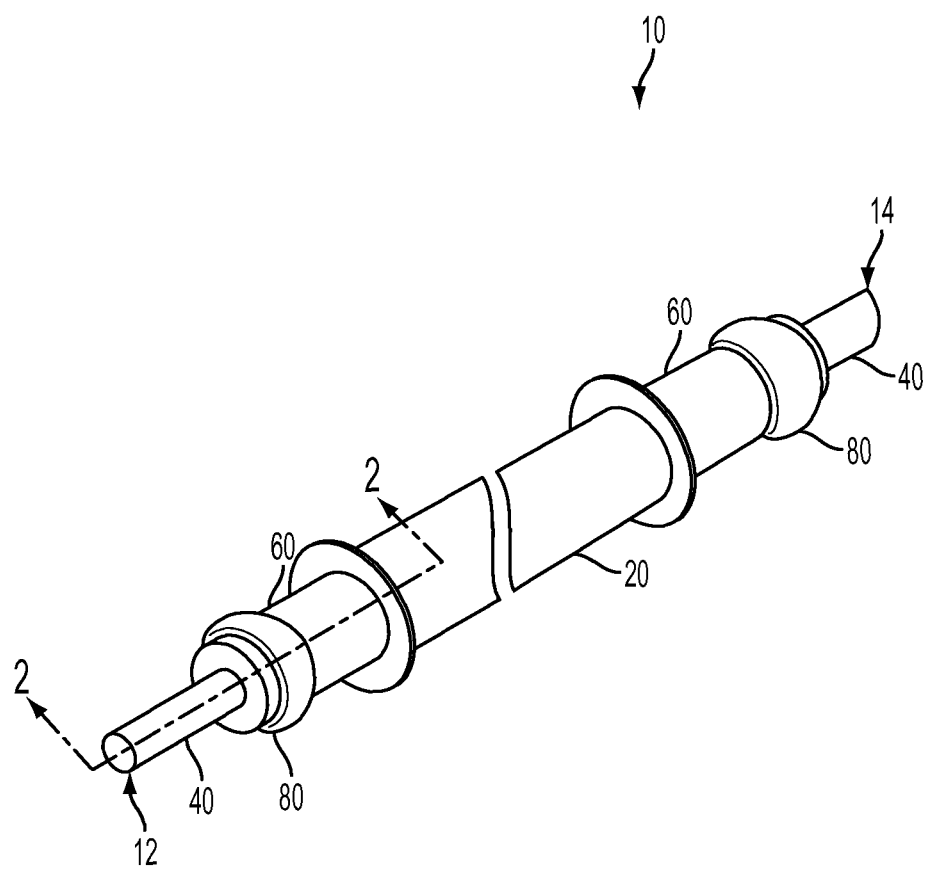
FIG. 1 is a perspective view of an example neutron detector in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 depicts an example neutron detector 10 in accordance with one aspect of the invention. In general, the neutron detector 10 can detect neutrons passing into the neutron detector 10. The neutron detector 10 includes an exterior shell 20 and a central structure 40 extending longitudinally through an interior of the exterior shell 20. An insulating portion 60 insulates the exterior shell 20 from the central structure 40. In accordance with an aspect of the present invention, a guard structure 80 extends circumferentially around the insulating portion 60 to reduce the likelihood of a leakage current on the insulating portion 60 from reaching the central structure 40. This guard structure 80 is maintained at a similar voltage as the central structure 40, such that the guard structure 80 will absorb and/or interrupt the leakage current prior to the leakage current reaching the central structure 40.

Turning to a general discussion of the neutron detector 10 and the operation thereof it is to be appreciated that the neutron detector is somewhat generically depicted in FIG. 1. It is to be appreciated that the neutron detector 10 can include any number of constructions. In the shown example, the neutron detector 10 extends longitudinally between a first end 12 and an opposing second end 14. The neutron detector 10 in this example extends along a generally linear axis, though in further examples, the neutron detector 10 could include bends, curves, undulations, or the like. Similarly, the neutron detector 10 is not limited to the shown dimensions, and in other examples could be longer/shorter or larger/smaller than as shown. Likewise, the neutron detector 10 can be housed within a housing or other similar structure.

The neutron detector 10 can be used in a wide variety of applications for monitoring/detecting neutrons. For example, the neutron detector 10 can be used in association with radiation safety applications, radiation monitoring of spent nuclear fuel, homeland security applications, etc. Of course, the neutron detector 10 is not limited to these applications, and could be used in further applications that involve monitoring/detecting neutrons.

Figure 2:
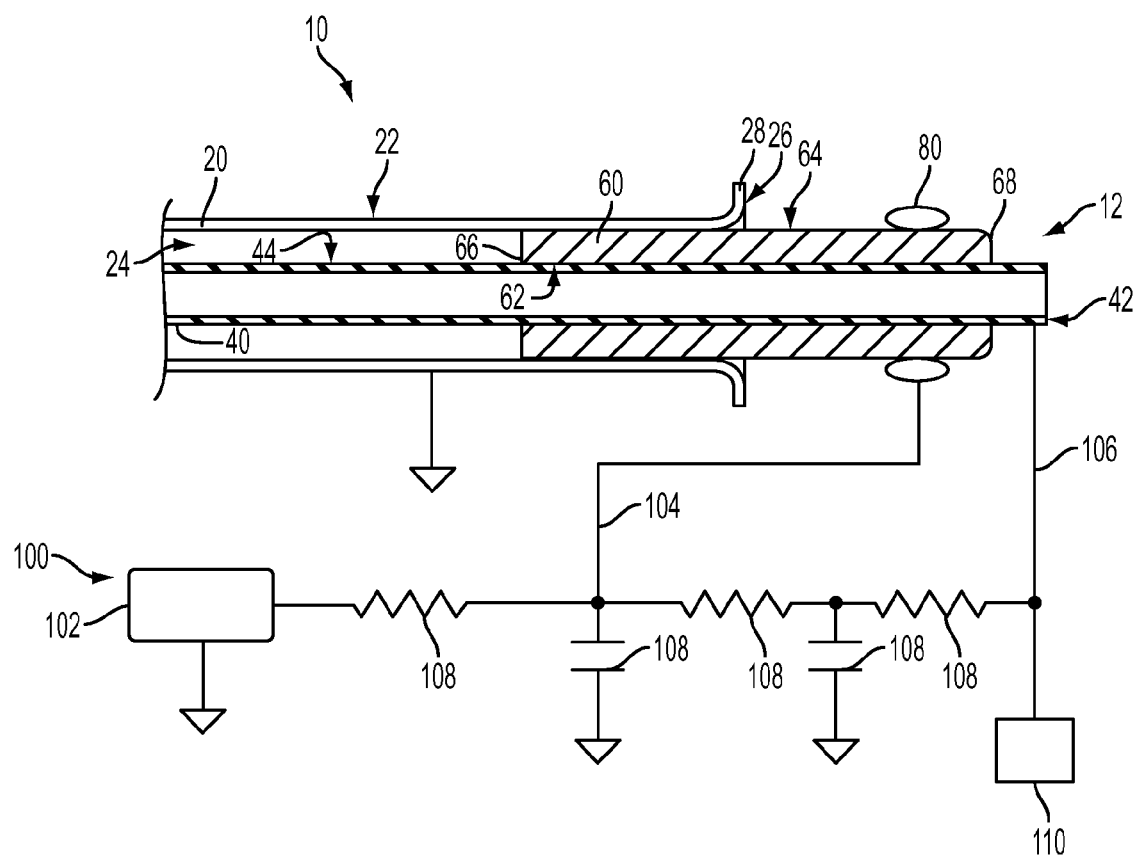
FIG. 2 is a sectional view of a portion of the example neutron detector along line 2-2 of FIG. 1, with associated, schematically shown components.

Turning now to FIG. 2, a sectional view of the first end 12 of the neutron detector 10 is shown. It is to be appreciated that FIG. 2 only depicts the first end 12, and not the second end 14, for ease of illustration. In operation, the second end 14 is generally identical to the first end 12 in size, structure and shape, but for being a mirror image of the first end 12. Accordingly, the following description of the first end 12 can be generally identical with respect to the second end 14 of the neutron detector 10.

The neutron detector 10 includes the exterior shell 20. The exterior shell 20 has a generally circular cross-sectional shape extending between the first end 12 and the second end 14 of the neutron detector 10. In other examples, the exterior shell is not limited to the circular cross-sectional shape, and instead could include elliptical, quadrilateral (e.g., square, rectangular, etc.), rounded cross-sectional shapes, or the like. The exterior shell 20 includes a wall 22 that bounds a substantially hollow interior volume 24. The exterior shell 20 can be constructed of various materials such as metals, including stainless steel, aluminum, etc. The exterior shell 20 can be electrically grounded, as shown in FIG. 2. In one example, the exterior shell 20 serves as a cathode of an electric circuit.

The exterior shell 20 extends between opposing shell ends 26. Though only one shell end 26 is shown in FIG. 2, it is to be understood that the opposing shell end can be generally identical to the shell end 26 shown in FIG. 2. In one example, the exterior shell 20 includes a shoulder 28 located at the shell end 26. The shoulder 28 defines a projection, outcropping, etc. that extends radially outwardly from a center of the exterior shell 20. In the shown example, the shoulder 28 has a larger cross-sectional size (e.g., diameter in FIG. 2), than center portions of the exterior shell 20. The shoulder 28 is not limited to this size, and in further examples, could extend a larger or shorter distance radially. The shoulder 28 is integrally formed (i.e., one piece formed) with the wall 22, though in other examples, the shoulder 28 could be separately attached with respect to the wall 22.

The neutron detector 10 further includes the central structure 40. The central structure 40 extends longitudinally within the interior volume 24 of the exterior shell 20. It is to be appreciated that the central structure 40 is somewhat generically/schematically depicted in FIG. 2 for illustrative purposes. For example, while only a portion of the central structure 40 is shown (i.e., first end 12 of neutron detector 10), the central structure 40 can extend entirely through the neutron detector 10 to the second end 14. As such, the remaining, unshown portion of the central structure 40 can be generally identical in size, shape, and orientation to the central structure 40 shown in FIG. 2.

In another example, the central structure 40 includes a wire, or at least has similar proportions to a wire. As such, the central structure 40 is not limited to the size or shape of the shown example. Rather, in other examples, the central structure 40 has a smaller or larger cross-sectional size (e.g., diameter in FIG. 2) than as shown. The central structure 40 extends generally along a central axis of the exterior shell 20, though in other examples, the central structure 40 could be off-center from the central axis of the exterior shell 20.

The central structure 40 extends longitudinally past the shell end 26 of the exterior shell 20. As such, the central structure 40 extends at least partially into the interior volume 24 of the exterior shell 20 while a portion of the central structure 40 is positioned at an exterior of the exterior shell 20. In the shown example, the central structure 40 includes a structure end 42 that is spaced apart a distance from the shell end 26. It is to be appreciated that the central structure 40 could extend a longer or shorter distance from the shell end 26 than as shown in FIG. 2.

The central structure 40 has a smaller cross-sectional size than the exterior shell 20 such that the central structure 40 is radially spaced inward from the exterior shell 20. In particular, an outer surface 44 of the central structure 40 is radially spaced apart from the wall 22 of the exterior shell 20. As such, a gap, space, or the like is formed between the outer surface 44 and the wall 22 within the interior volume 24. Of course, depending on the respective cross-sectional dimensions of the central structure 40 and exterior shell 20, the size of this gap/space could be larger or smaller. This gap/space of the interior volume 24 may be filled with gas (or a mixture of gases) including, for example, helium-3 ($^3$HE), to assist in neutron detection. The exterior shell 20 provides a boundary/seal of the interior volume 24 to limit the ingress/egress of the gas or gases into/out of the exterior shell 20. In other examples, the wall 22 of the exterior shell 20 can be covered and/or coated with a material to improve neutron detection.

The central structure 40 can be constructed of various metals, including stainless steel, aluminum, etc. As will be described in more detail below, the central structure 40 is maintained at a first voltage. In one example, the central structure 40 serves as an anode of the electric circuit.

Turning now to the insulating portion 60, the insulating portion 60 is positioned between the exterior shell 20 and central structure 40. The neutron detector 10 includes insulating portions 60 disposed at each of the first end 12 and second end 14. Accordingly, while only the insulating portion 60 at the first end 12 is shown in FIG. 2, the insulating portion 60 at the second end 14 can be generally identical in size and shape.

The insulating portion 60 extends radially between the outer surface 44 of the central structure 40 and the wall 22 of the exterior shell 20. The insulating portion 60 is in contact with each of the central structure 40 and exterior shell 20. The insulating portion 60 can be formed of a number of materials, such as a ceramic material or the like. The insulating portion 60 therefore is for the purpose of electrically isolating the central structure 40 from the exterior shell 20 to limit and/or prevent electrical charges from passing between the central structure 40 and exterior shell 20.

The insulating portion 60 extends radially between an inner insulating surface 62 and an outer insulating surface 64. The inner insulating surface 62 extends circumferentially around the outer surface 44 of the central structure 40. As such, the insulating portion 60 supports and/or houses a portion (e.g., an end portion) of the central structure 40. The outer insulating surface 64 is in contact with a portion of the wall 22 of the exterior shell 20.

The insulating portion 60 can be attached with respect to the central structure 40 and exterior shell 20 in any number of ways. In one example, the insulating portion 60 is brazed to either or both of the central structure 40 and exterior shell 20. In such an example, attachment structures (e.g., bands, metallic bands, etc.) may be provided for brazing to the central structure 40 and exterior shell 20. Of course, other means of attachment, such as adhesives, mechanical fasteners, etc., are envisioned.

The insulating portion 60 extends between a first insulating end 66 and an opposing second insulating end 68. The first insulating end 66 is positioned within the interior volume 24 of the exterior shell 20. The insulating portion 60 extends longitudinally from the first insulating end 66 towards the second insulating end 68. The insulating portion 60 could extend a longer or shorter distance into the interior volume 24 of the exterior shell 20 than as shown. The second insulating end 68 is positioned at an exterior of the exterior shell 20. In one example, the second insulating end 68 is in closer proximity to the structure end 42 of the central structure 40 than the shell end 26 of the exterior shell 20. Of course, the insulating portion 60 is not limited to the specific configuration shown in FIG. 2. Rather, in other examples, the second insulating end 68 will extend a longer or shorter distance than as shown, such as by extending all the way to the structure end 42. Since the second insulating end 68 is located outside of the exterior shell 20, a portion of the outer insulating surface 64 that extends between the shell end 26 and structure end 42 is generally exposed to the ambient environment.

Turning now to the guard structure 80, the guard structure 80 extends circumferentially around the insulating portion 60. It is to be appreciated that the guard structure 80 is somewhat generically/schematically shown in FIG. 2, as the guard structure 80 includes a number of different sizes and shapes. In general, the guard structure 80 contacts the outer insulating surface 64 while extending around the insulating portion 60. The guard structure 80 includes a generally rounded cross-sectional shape (e.g., oval in shown example), though in other examples, the guard structure 80 includes a circular cross-sectional shape, quadrilateral cross-sectional shape with rounded corners, etc.

The guard structure 80 is positioned on the insulating portion 60 between the shell end 26 and the structure end 42. In the shown example, the guard structure 80 is positioned in closer proximity to the structure end 42 than the shell end 26. However, the guard structure 80 is not limited to such a location, and in other examples, could be positioned in closer proximity to the structure end 42 (or, alternatively, to the shell end 26) than as shown. In one possible example, the guard structure 80 is positioned at the second insulating end 68 of the insulating portion 60. By being positioned on the insulating portion 60, the guard structure 80 is electrically isolated from the central structure 40.

The guard structure 80 can be constructed of various metals, including stainless steel, aluminum, etc. For example, the guard structure 80 can include a conductive material such that the guard structure 80 can be maintained at a second voltage. In one example, this second voltage is substantially identical to the first voltage of the central structure 40. Of course, in further examples, the first and second voltages need not be identical, and instead could be different voltages.

Referring still to FIG. 2, an electric circuit 100 is operatively attached to the neutron detector 10. It is to be understood that the electric circuit in the shown example includes only one possible wiring schematic diagram. Indeed, various other possible wiring methods are envisioned for the electric circuit 100.

The electric circuit 100 includes a power supply 102 for supplying power to the neutron detector 10. The power supply 102 supplies power, for example, to the central structure 40 and the guard structure 80. In one example, the power supply 102 is a high voltage power supply, such as a 1500 volt power supply. Of course, the power supply 102 is not limited to 1500 volts, as other voltages are envisioned.

The power supply 102 is electrically connected to the guard structure 80 by a first connection means 104. The first connection means 104 can include a wire or other similar device for electrically connecting the guard structure 80 and power supply 102. Current flows from the power supply 102, through the first connection means 104, and to the guard structure 80. As such, the guard structure 80 is maintained at a voltage (e.g., the second voltage, as described above).

The power supply 102 is also electrically connected to the central structure 40 by a second connection means 106. The second connection means 106 can include a wire or other similar device for electrically connecting the central structure 40 and power supply 102. Current flows from the power supply 102, through the second connection means 106, and to the central structure 40. As such, the central structure 40 is maintained at a voltage (e.g., the first voltage, as described above) such that the central structure 40 serves as an anode.

The electric circuit 100 further includes one or more electrical components 108 electrically connected to the power supply 102. These electrical components 108 can include, for example, resistors, capacitors, etc. The electrical components 108 are provided such that an impedance for one path (i.e., from power supply 102 through first connection means 104 to guard structure 80) is substantially similar to an impedance for the other path (i.e., from power supply 102 through second connection means 106 to central structure 40). Of course, in other examples, the electric circuit 100 is not limited to the specific layout of the electrical components 108 shown in FIG. 2, as other configurations are envisioned.

The electric circuit 100 further includes detection electronics 110. The detection electronics 110 are somewhat generically/schematically depicted in FIG. 2. The detection electronics 110 are electrically connected to neutron detector 10. The detection electronics 110 can measure the signal from the neutron detector 10, in particular the central structure 40 (e.g., anode). The detection electronics 110 can further provide a digital output for software evaluation. The detection electronics 110 can include, for example, data acquisition components, data acquisition software, controllers, etc.

Referring still to FIG. 2, one example operation of the neutron detector 10 will now be described. Initially, a quantity of gas(es), such as $^3$He gas, is added to the interior volume 24 of the exterior shell 20. The gas may be solely $^3$He gas or $^3$He gas may be mixed with other gas(es) such as argon and a quench gas. As ions or particles resulting from neutron reactions pass through the interior volume 24, free electrons are created from collisions with the $^3$He gas. These free electrons are drawn toward the central structure 40, which acts as the anode, whereupon the free electrons are collected to generate a signal or electronic pulse.

Due to the voltage difference between the central structure 40, acting as the anode, and the exterior shell 20, acting as the cathode, the electrons produced are attracted to the central structure 40. The free electrons that collect on the central structure 40 result in the signal or electronic pulse that is amplified and/or digitized. This signal is then analyzed to determine several measurable quantities, such as neutron count rate, etc.

Leakage current (i.e., current that does not originate from the free electrons on the central structure 40) can attempt to migrate toward the central structure 40 along the insulating portion 60. If such leakage current reaches the central structure 40 it will adversely affect the measuring capability of the neutron detector 10. For example, the leakage current will generate false neutron count results in the central structure 40. This leakage current can originate from degradation/breakdown at the outer insulating surface 64, which causes an accumulation of charge on the insulating portion 60. In accordance with an aspect of the present invention, the guard structure 80 limits and/or reduces this leakage current from reaching the central structure 40 (e.g., the structure end 42 of the central structure 40).

As mentioned, the guard structure 80 can maintained at the second voltage, which may be substantially identical to the first voltage of the central structure 40. Accordingly, the leakage current on the outer insulating surface 64 of the insulating portion 60 (i.e., between the shell end 26 and the guard structure 80) is absorbed and/or interrupted by the guard structure 80 such that the leakage current will not involve the central structure 40. The guard structure 80 will therefore limit/prevent this leakage current from passing along the outer insulating surface 64 and to the structure end 42 of the central structure 40. As such, the likelihood of a false neutron count at the central structure 40 will be reduced.

Figure 3:
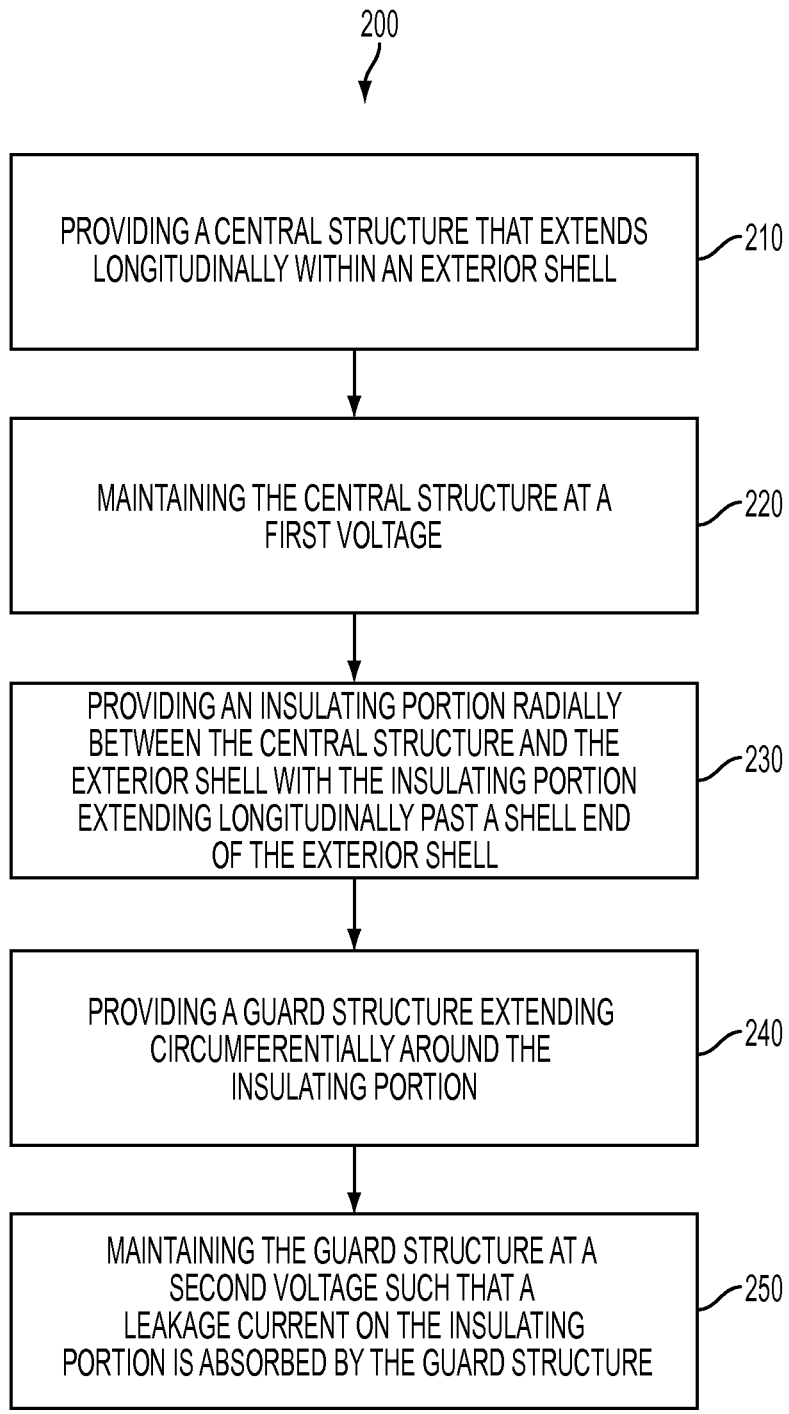
FIG. 3 is a flowchart depicting a method of detecting neutrons with the example neutron detector of FIG. 1.

Turning now to FIG. 3, an example method 200 of detecting neutrons with the neutron detector 10 is shown. The method 200 can be performed in association with the example neutron detector 10 shown and described above with reference to FIGS. 1 and 2. Also, it is to be appreciated that the method 200 is presented as a series of linear steps. This linear sequence is only for convenience and ease of understanding. The method sets may be performed in a different sequence order, with some steps being simultaneous, or the like. As such the presented example method, and steps therein, presented within FIG. 3 need not be specific limitations upon the present invention.

The method 200 includes a step 210 of providing the central structure 40 extending longitudinally within the exterior shell 20. In particular, as described above with respect to FIG. 2, the central structure 40 extends longitudinally within the interior volume 24 of the exterior shell 20. In one example, the central structure 40 is substantially coaxial with the exterior shell 20, though in other examples, the central structure 40 could be offset from a central axis of the exterior shell 20.

The method 200 includes a step 220 of maintaining the central structure 40 at the first voltage. In particular, the central structure 40 is electrically connected to the power supply 102 by the second connection means 106. The central structure 40 will therefore be maintained at the first voltage, such that the central structure 40 serves as an anode.

The method 200 further includes a step 230 of providing the insulating portion 60 extending radially between the central structure 40 and the exterior shell 20 with the insulating portion 60 extending longitudinally past the shell end 26. In one example, the insulating portion 60 extends radially between the outer surface 44 of the central structure 40 and the wall 22 of the exterior shell 20. The insulating portion 60 therefore electrically isolates the central structure 40 from the exterior shell 20. In addition, the insulating portion 60 extends longitudinally between the first insulating end 66 (positioned within the interior volume 24) and the opposing second insulating end 68, which is located at an exterior of the exterior shell 20 and past the shell end 26.

The method 200 includes a step 240 of providing the guard structure 80 extending circumferentially around the insulating portion 60. In particular, the guard structure 80 is in contact with the outer insulating surface 64 while extending around the insulating portion 60. The guard structure 80 can be positioned in closer proximity to the structure end 42 than the shell end 26.

The method 200 includes a step 250 of maintaining the guard structure 80 at the second voltage such that the leakage current on the insulating portion 60 is absorbed and/or interrupted by the guard structure 80. In particular, the guard structure 80 is electrically connected to the power supply 102 by the first connection means 104. The guard structure 80 will therefore be maintained at the second voltage, with the guard structure 80 being electrically isolated from the central structure 40. Accordingly, leakage current on the outer insulating surface 64 of the insulating portion 60 will be absorbed and/or interrupted by the guard structure 80 prior to the leakage current reaching the central structure 40 such that the leakage current will not involve the central structure 40.

Figure 4:
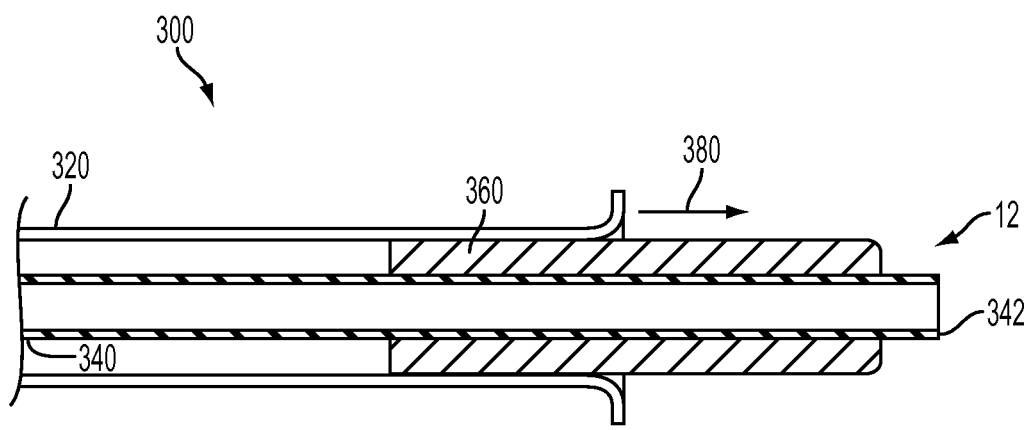
FIG. 4 is a sectional view of a prior art neutron detector.

As previously mentioned, FIG. 4 is an example of the previously known neutron detector 300. As a comparison, the exterior shell 320, the central structure 340, and the insulating portion 360 of the neutron detector 300 of FIG. 4 are substantially identical to the exterior shell 20, central structure 40, and insulating portion 60 described with reference to FIG. 2. As should be appreciated, the neutron detector 300 of FIG. 4 does not include the guard structure 80 as shown in FIG. 2.

In operation of the previously known detector 300, leakage current (i.e., current that does not originate from the free electrons on the central structure 40) can travel along the insulating portion 360 in a first direction 380 (shown generically/schematically as an arrow in FIG. 4). The leakage current traveling along the first direction 380 can reach a structure end 342 of the central structure 340. This leakage current can adversely affect the measuring capability of the neutron detector 300 by generating a false current. Accordingly, the neutron detector 10 in accordance with the present invention having a guard structure (e.g., 80, FIG. 2) can reduce the aforementioned drawback of the previously known neutron detector 300.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A neutron detector for detecting neutrons, the neutron detector including:
   an exterior shell bounding and sealing an interior volume, the exterior shell serving as a cathode;
   a central structure extending longitudinally within the exterior shell, the central structure serving as an anode and being maintained at a first voltage greater than electrical ground;
   an insulating portion extending radially around the central structure and between the central structure and the exterior shell, the insulating portion extending longitudinally past a shell end of the exterior shell towards a structure end of the central structure; and
   a guard structure extending circumferentially around an outer insulating surface of the insulating portion, the guard structure being positioned on the insulating portion between the shell end and the structure end, wherein the guard structure is maintained at a second voltage greater than electrical ground such that a leakage current on the outer insulating surface of the insulating portion is absorbed by the guard structure.

2. The neutron detector of claim 1, wherein the central structure extends beyond the shell end of the exterior shell outside of the exterior shell such that the structure end of the central structure is spaced a distance apart from the shell end.

3. The neutron detector of claim 2, wherein the insulating portion extends circumferentially around an outer surface of the central structure, the insulating portion extending longitudinally outwardly from the interior volume of the exterior shell towards the structure end of the central structure.

4. The neutron detector of claim 3, wherein the insulating portion is electrically isolated from the central structure.

5. The neutron detector of claim 4, wherein the second voltage is substantially equivalent to the first voltage such that the insulating portion and the central structure are maintained at substantially equivalent voltages.

6. The neutron detector of claim 1, wherein the guard structure includes a conductive material.

7. The neutron detector of claim 6, wherein the guard structure is in contact with the outer insulating surface of the insulating portion.

8. The neutron detector of claim 7, wherein the guard structure is positioned in closer proximity to the structure end of the central structure than the shell end of the exterior shell.

9. The neutron detector of claim 8, wherein the guard structure includes a rounded cross-sectional shape.

10. A neutron detector for detecting neutrons, the neutron detector including:
    an exterior shell bounding and sealing an interior volume, the exterior shell serving as a cathode;
    a central structure extending longitudinally within the exterior shell, the central structure serving as an anode and being maintained at a first voltage greater than electrical ground;
    an insulating portion extending radially around the central structure and between the central structure and the exterior shell, the insulating portion extending longitudinally past a shell end of the exterior shell towards a structure end of the central structure; and
    a guard structure extending circumferentially around an outer insulating surface of the insulating portion, the guard structure being positioned on the insulating portion between the shell end and the structure end, the guard structure being maintained at a substantially equivalent voltage as the central structure, wherein the guard structure is electrically isolated from the central structure such that a leakage current on the outer insulating surface of the insulating portion is absorbed by the guard structure.

11. The neutron detector of claim 10, wherein the central structure extends beyond the shell end of the exterior shell outside of the exterior shell such that the structure end of the central structure is spaced a distance apart from the shell end.

12. The neutron detector of claim 11, wherein the insulating portion extends circumferentially around an outer surface of the central structure, the insulating portion extending longitudinally outwardly from the interior volume of the exterior shell towards the structure end of the central structure.

13. The neutron detector of claim 12, wherein the guard structure is in contact with the outer insulating surface of the insulating portion.

14. The neutron detector of claim 13, wherein the insulating portion is electrically isolated from the central structure.

15. The neutron detector of claim 10, wherein the guard structure includes a conductive material.

16. A method of detecting neutrons with a neutron detector, the method including the steps of:
    providing a central structure that extends longitudinally within an exterior shell;
    maintaining the central structure at a first voltage greater than electrical ground;
    providing an insulating portion radially around the central structure and between the central structure and the exterior shell with the insulating portion extending longitudinally past a shell end of the exterior shell;
    providing a guard structure extending circumferentially around the insulating portion; and
    maintaining the guard structure at a second voltage greater than electrical ground such that a leakage current on the insulating portion is absorbed by the guard structure.

17. The method of claim 16, wherein the second voltage is substantially equivalent to the first voltage.

18. The method of claim 16, wherein the guard structure is in contact with an outer insulating surface of the insulating portion.

19. The method of claim 16, wherein the guard structure has a rounded cross-sectional shape.

20. The method of claim 16, wherein the guard structure is positioned closer to a structure end of the central structure than the shell end of the exterior shell.

* * * * *